United States Patent
Nishino et al.

(10) Patent No.: US 8,911,071 B2
(45) Date of Patent: Dec. 16, 2014

(54) INK JET INK, INK CARTRIDGE, AND INK JET RECORDING METHOD

(75) Inventors: Yuuki Nishino, Kawasaki (JP); Daiji Okamura, Tokyo (JP); Kousuke Yamasaki, Kawasaki (JP); Mitsuru Ishii, Kamagaya (JP); Hirofumi Ichinose, Tokyo (JP); Hiroshi Tomioka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 444 days.

(21) Appl. No.: 13/323,659

(22) Filed: Dec. 12, 2011

(65) Prior Publication Data

US 2012/0154481 A1    Jun. 21, 2012

(30) Foreign Application Priority Data

Dec. 16, 2010    (JP) ................... 2010-281061

(51) Int. Cl.
| | |
|---|---|
| B41J 2/01 | (2006.01) |
| B41J 2/17 | (2006.01) |
| C08G 18/08 | (2006.01) |
| B41J 2/21 | (2006.01) |
| C09D 11/322 | (2014.01) |
| C09D 11/102 | (2014.01) |
| C08G 18/66 | (2006.01) |
| C08G 18/73 | (2006.01) |
| C08G 18/75 | (2006.01) |
| C08G 18/80 | (2006.01) |
| C08G 18/22 | (2006.01) |
| C08G 18/28 | (2006.01) |
| C08G 18/44 | (2006.01) |

(52) U.S. Cl.
CPC ........... *C08G 18/0823* (2013.01); *B41J 2/2107* (2013.01); *B41J 2/01* (2013.01); *C09D 11/322* (2013.01); *C09D 11/102* (2013.01); *C08G 18/6659* (2013.01); *C08G 18/6692* (2013.01); *C08G 18/73* (2013.01); *C08G 18/755* (2013.01); *C08G 18/8064* (2013.01); *C08G 18/222* (2013.01); *C08G 18/283* (2013.01); *C08G 18/44* (2013.01)
USPC ............................. 347/100; 347/95; 523/160

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
USPC ................... 347/100; 106/31.6, 31.27, 31.13; 523/160, 161
See application file for complete search history.

(56) References Cited

U.S. PATENT DOCUMENTS

| | | | |
|---|---|---|---|
| 5,356,464 A * | 10/1994 | Hickman et al. ............. | 347/100 |
| 2001/0001103 A1 * | 5/2001 | Noguchi et al. ............. | 528/71 |
| 2007/0148460 A1 * | 6/2007 | Licht et al. ................. | 428/403 |
| 2009/0227701 A1 * | 9/2009 | Kruger et al. ............... | 522/174 |
| 2011/0292113 A1 * | 12/2011 | Nagase et al. ............... | 347/20 |

FOREIGN PATENT DOCUMENTS

| | | |
|---|---|---|
| JP | 2000-001639 A | 1/2000 |
| JP | 2005-515289 A | 5/2005 |
| JP | 2005-325190 A | 11/2005 |
| JP | 2006-022132 A | 1/2006 |
| JP | 3897268 B2 | 3/2007 |
| JP | 2010-195944 A | 9/2010 |

* cited by examiner

*Primary Examiner* — Manish S Shah
(74) *Attorney, Agent, or Firm* — Canon U.S.A. Inc., IP Division

(57) ABSTRACT

An ink jet ink includes a pigment and a polyurethane polymer having units derived from a polyisocyanate, a polyol, and a diol having an acid group, and in the ink jet ink described above, an acid value of the polyurethane polymer is 20 mgKOH/g or more and 100 mgKOH/g or less, the unit derived from the polyisocyanate includes a unit derived from a compound represented by the following general formula (I), and the proportion of the unit derived from the compound represented by the general formula (I) in the unit derived from the polyisocyanate is 90 percent by mole or less.

General Formula (I)

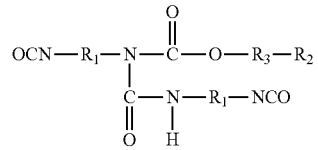

9 Claims, No Drawings

INK JET INK, INK CARTRIDGE, AND INK JET RECORDING METHOD

BACKGROUND OF THE INVENTION

1. Field of the Invention

The present invention relates to an ink jet ink, an ink cartridge using the ink jet ink, and an ink jet recording method.

2. Description of the Related Art

In recent years, concomitant with improvement in image quality and recording speed, an ink jet recording apparatus has been increasingly used in various business fields. As the performance required for an ink jet ink used in business fields, for example, ink reliability (such as ejection stability) and image fastness (such as scratch resistance and maker resistance) may be mentioned. In order to improve the performance described above, pigment inks containing various polyurethane polymers have been investigated (Japanese Patent No. 3897268, PCT Japanese Translation Patent Publication No. 2005-515289, and Japanese Patent Laid-Open Nos. 2006-022132 and 2010-195944). Japanese Patent No. 3897268 has disclosed that when an ink containing a pigment and an aqueous polyurethane polymer having specified acid value and number average molecular weight is used, the ejection stability and film properties (water resistance and abrasion resistance) are improved. PCT Japanese Translation Patent Publication No. 2005-515289 has disclosed an aqueous ink jet ink containing a polyurethane polymer dispersion having an acid group and a self-dispersing pigment. In addition, Japanese Patent Laid-Open Nos. 2006-022132 and 2010-195944 have each disclosed an ink containing a polyurethane polymer which uses an allophanate-modified polyisocyanate.

SUMMARY OF THE INVENTION

An ink jet ink according to aspects of the present invention includes: a pigment; and a polyurethane polymer having units derived respectively from a polyisocyanate, a polyol, and a diol having an acid group, and in this ink jet ink, an acid value of the polyurethane polymer is 20 mgKOH/g or more and 100 mgKOH/g or less, the unit derived from the polyisocyanate includes a unit derived from a compound represented by the following general formula (I), and the proportion of the unit derived from the compound represented by the general formula (I) in the unit derived from the polyisocyanate is 90 percent by mole or less.

General formula (I)

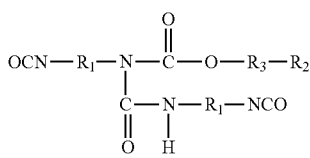

In the general formula (I), $R_1$ indicates an alkylene group having 6 to 10 carbon atoms, a cycloalkylene group having 6 to 14 carbon atoms, or an arylene group having 6 to 16 carbon atoms. $R_2$ indicates an alkyl group having 1 to 5 carbon atoms. $R_3$ at least has the structure represented by the following general formula (II).

General formula (II)

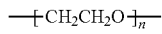

In the general formula (II), n is 4 or more and 70 or less.

According to an embodiment of the present invention, an ink jet ink which is excellent in the scratch resistance of image, the highlighter resistance thereof, and the ink ejection stability and which can also suppress the image deflection caused by the face wetting can be provided. In addition, according to another embodiment of the present invention, an ink cartridge and an ink jet recording method, each of which uses the ink described above, can be provided.

Further features of the present invention will become apparent from the following description of exemplary embodiments.

DESCRIPTION OF THE EMBODIMENTS

Hereinafter, with reference to preferable embodiments, aspects of the present invention will be described in detail.

According to the results of an investigation carried out by the present inventors, it was found that when the content of a polyurethane polymer in an ink is increased, in an ink jet recording head, the polyurethane polymer is liable to be precipitated at a portion at which ejection energy is applied to the ink, and as a result, the ejection thereof becomes unstable. In addition, the portion at which ejection energy is applied to the ink is a heater surface in the case of a thermal ink jet method and is a surface of a piezoelectric element in the case of an ink jet method using a piezoelectric element.

Furthermore, when an ink containing a polyurethane polymer is ejected from an ink jet recording head, "face wetting" occurs in which a polymer component in the ink adheres to a face of the recording head (face of the recording head, which has ink ejection orifices to eject an ink). In this case, because of the influence of the polymer component adhering to the face, a flying direction of an ejected ink droplet is shifted from a targeted direction. Although being small right after an ink droplet is ejected, this shift is increased until the ink droplet reaches a recording medium, and as a result, a problem in that dots forming an image are partially deflected occurs, that is, deflection occurs in the image (hereinafter referred to as the "image deflection"). This image deflection no only occurs in a thermal ink jet method but also occurs in an ink jet method using a piezoelectric element.

According to the investigation by the present inventors, it was found that in order to obtain sufficient film properties (water resistance and abrasion resistance) of image from the ink disclosed in Japanese Patent No. 3897268, the content of the polyurethane polymer must be increased. In this case, as described above, the ejection stability of ink was degraded by polymer precipitation which occurred at a portion at which ejection energy was applied to an ink (hereinafter simply referred to as "ink ejection stability"), and furthermore, the image deflection was also generated by the face wetting. On the other hand, when the content of the polyurethane polymer is decreased, sufficient film properties were not only obtained, but the image deflection caused by the face wetting was also not improved. According to the method disclosed in PCT Japanese Translation Patent Publication No. 2005-515289, although the scratch resistance of image and the highlighter resistance thereof were improved, the ink ejection stability was not satisfactory. Furthermore, the image deflection caused by the face wetting occurred. Since the polyurethane polymer using an allophanate modified polyisocyanate disclosed in Japanese Patent Laid-Open No. 2006-022132 is synthesized for gravure printing, the hydrophobicity of the ink is high, and it is even difficult to just eject the ink from an ink jet recording head. The polyurethane polymer disclosed in Japanese Patent Laid-Open No. 2010-195944 had inferior scratch resistance and highlighter resistance.

Therefore, aspects of the present invention provide an ink jet ink which is excellent in the scratch resistance of image, the highlighter resistance thereof, and the ink ejection stability and which can also suppress the image deflection caused by the face wetting. In addition, aspects of the present invention also provide an ink cartridge and an ink jet recording method, each of which uses the ink according to aspects of the present invention.

An ink jet ink (hereinafter referred to as "ink") according to aspects of the present invention comprises: a pigment; and a polyurethane polymer having units derived respectively from a polyisocyanate, a polyol, and a diol having an acid group, and in this ink jet ink, an acid value of the polyurethane polymer is 20 mgKOH/g or more and 100 mgKOH/g or less, the unit derived from the polyisocyanate comprises a unit derived from a compound represented by the following general formula (I), and the proportion of the unit derived from the compound represented by the general formula (I) in the unit derived from the polyisocyanate is 90 percent by mole or less. According to aspects of the present invention, the "unit" indicates a unit structure derived from a monomer forming the polyurethane polymer.

General formula (I)

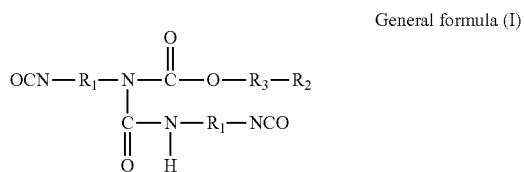

In the general formula (I), $R_1$ indicates an alkylene group having 6 to 10 carbon atoms, a cycloalkylene group having 6 to 14 carbon atoms, or an arylene group having 6 to 16 carbon atoms. $R_2$ indicates an alkyl group having 1 to 5 carbon atoms. $R_3$ at least has the structure represented by the following general formula (II).

General formula (II)

In the general formula (II), n is 4 or more and 70 or less.

A common polyurethane polymer has units derived respectively from a polyisocyanate, a polyol, and a diol having an acid group. First, the present inventors examined causes relating to the face wetting generated by using an ink containing a common polyurethane polymer as described above. As a result, it was found that the unit derived from a polyisocyanate in the polyurethane polymer has influence on the face wetting. Details will be described below.

As polyisocyanates generally used when a polyurethane polymer is synthesized, for example, an aliphatic polyisocyanate, an alicyclic polyisocyanate, an aromatic polyisocyanate, and an araliphatic polyisocyanate may be mentioned. Those polyisocyanates each have a highly hydrophobic structure, such as an alkyl chain, an alicyclic structure, or an aromatic structure, in its molecule. That is, in a polyurethane polymer containing only a unit derived from the above commonly used polyisocyanate as the unit derived from a polyisocyanate, a highly hydrophobic portion is present in the structure of the polyurethane polymer. In addition, in order to suppress the ejection from being disturbed by adhesion of ink droplets to a face, the face of an ink jet recording head is processed by a hydrophobic treatment to have a high hydrophobicity. Accordingly, when an ink containing the above polyurethane polymer is ejected from an ink jet recording head, a portion of the structure of the polyurethane polymer having a high hydrophobicity will have hydrophobic interaction with the face of the recording head having a high hydrophobicity. Hence, a phenomenon in which a polyurethane polymer adheres to the face, that is, the face wetting, occurs, and as a result, the image deflection occurs. In addition, the hydrophobic-treated face according to aspects of the present invention indicates a "face having a contact angle of 90° or more with pure water". Although the hydrophobic treatment of the face of the recording head is not particularly limited, for example, a method for processing the face of the recording head with a water repellent formed of a silicone or a fluorine compound may be mentioned. As the water repellent, for example, KP-801 (manufactured by Shin-Etsu Chemical Co., Ltd.), Defensa (manufactured by DIC Corporation), Citop CTX-105, 805 (manufactured by Asahi Glass Co., Ltd), Teflon AF (manufactured by E. I. du Pont de Nemours and Company) may be mentioned. In addition, a fluorine-containing silane compound may also be used as the water repellent.

As described above, it was found that in order to suppress the face wetting, reduction in hydrophobicity of the unit derived from the polyisocyanate in the polyurethane polymer is important. Accordingly, through investigation on various types of polyisocyanates carried out by the present inventors, the compound represented by the above general formula (I) was finally found.

The compound represented by the general formula (I) is a polyisocyanate having an allophanate bond and a polyethylene glycol group. Since a polyethylene glycol group is a functional group having a high hydrophilicity, the compound represented by the general formula (I) has a low hydrophobicity as compared to that of a related common polyisocyanate. Hence, a polyurethane polymer having the unit derived from the compound represented by the general formula (I) as described above is not likely to have hydrophobic interaction with the face of the recording head, and as a result, the face wetting is suppressed.

Accordingly, the present inventors performed investigation using a polyurethane polymer containing only the unit derived from the compound represented by the general formula (I) as the unit derived from a polyisocyanate (that is, the polyurethane polymer in which the proportion of the unit derived from the compound represented by the general formula (I) in the unit derived from a polyisocyanate is 100 percent by mole). As a result, although the image deflection caused by the face wetting was suppressed, and the ink ejection stability was improved, the scratch resistance of image and the highlighter resistance thereof were degraded. The reason for this is believed that when only the compound represented by the general formula (I) is used as the polyisocyanate, the hydrophilicity of the unit derived from a polyisocyanate is increased, and the strength of a hard segment of the polyurethane formed, for example, from the unit derived from a polyisocyanate is decreased.

According to the result described above, the conclusion was obtained as described below. That is, it is important that by using a commonly used polyisocyanate having a high hydrophobicity together with the compound represented by the general formula (I), the hydrophilicity/hydrophobicity of the unit derived from a polyisocyanate is adjusted to an appropriate level (level at which the hydrophobicity is not so much to cause the face wetting, and the hydrophilicity is not so much to decrease the strength of the hard segment). Accordingly, through investigation on a particular effective mixing proportion between the above two compounds, it was found that when the proportion of the unit derived from the compound represented by the general formula (I) in the unit derived from a polyisocyanate is 90 percent by mole or less (and more than 0 percent by mole), the hydrophobic interaction with the face of the recording head can be suppressed while the strength of the hard segment is maintained, and the suppression of the face wetting can be obtained simultaneously with the scratch resistance of image and the highlighter resistance thereof. When the above proportion is higher than 90 percent by mole, the hydrophilicity of the unit derived from a polyisocyanate is increased, and the strength of the hard segment of the polyurethane polymer is decreased; hence, the scratch resistance of image and the highlighter resistance thereof are degraded. In addition, the proportion of the unit derived from the compound represented by the general formula (I) in the unit derived from a polyisocyanate may be 14 percent by mole or more.

Through further investigation carried out by the present inventors, it was also found that the effect according to aspects of the present invention can be obtained only when the acid value of the polymer is 20 mgKOH/g or more and 100 mgKOH/g or less. The reason for this is believed to be that when the acid value is too high or too low, since the hydrophilicity/hydrophobicity of the unit derived from a polyisocyanate is affected by that of the whole polyurethane polymer, the effect obtained by containing the unit derived from the compound represented by the general formula (I) at a specific proportion cannot be obtained. According to the mechanism described above, when the individual components synergistically work together, the effect according to aspects of the present invention can be obtained.

[Ink Jet Ink]

Hereinafter, the individual components forming the ink jet ink according to aspects of the present invention will be respectively described.

<Polyurethane Polymer>

The polyurethane polymer used for the ink according to aspects of the present invention has a unit derived from a polyisocyanate which contains the compound represented by the general formula (I) at a proportion of 90 percent by mole or less, a unit derived from a polyol, and a unit derived from a diol having an acid group. Furthermore, the acid value of the polyurethane polymer is 20 mgKOH/g or more and 100 mgKOH/g or less.

(Compound Represented by General Formula (I))

The polyurethane polymer used for the ink according to aspects of the present invention has a unit derived from the compound represented by the following general formula (I).

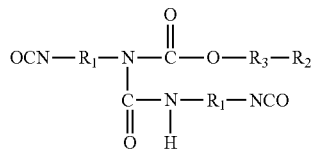

General formula (I)

In the general formula (I), $R_1$ indicates an alkylene group having 6 to 10 carbon atoms, a cycloalkylene group having 6 to 14 carbon atoms, or an arylene group having 6 to 16 carbon atoms. $R_2$ indicates an alkyl group having 1 to 5 carbon atoms. $R_3$ at least has the structure represented by the following general formula (II). In addition, $R_1$ and $R_2$ may be substituted with an alkyl group having 1 to 3 carbon atoms.

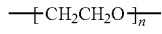

General formula (II)

In the general formula (II), n is 4 or more and 70 or less. In addition, the proportion (percent by mass) of the unit derived from the compound represented by the general formula (I) in the polyurethane polymer may be 5.0 percent by mass or more and 90.0 percent by mass or less.

The compound represented by the general formula (I) is obtained, for example, by a reaction between a diisocyanate and a polyethylene glycol monoalkyl ether as shown in the following formulas (1) and (2). The structure of a portion enclosed with a dotted line in the following formula (2) indicates an "allophanate bond".

Formula (1)

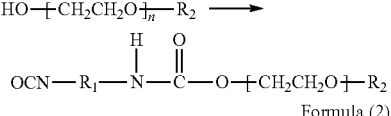

Formula (2)

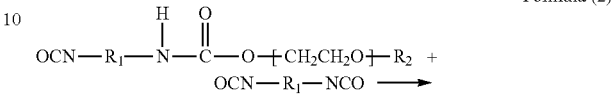

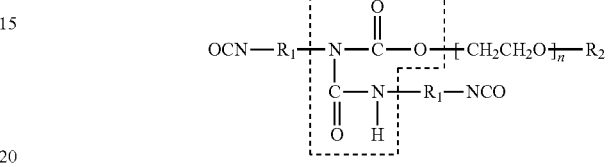

The diisocyanate and the polyethylene glycol monoalkyl ether used as raw materials of the compound represented by the general formula (I) will be described.

(1) Diisocyanate

An alkyl group other than two isocyanate groups of the diisocyanate used as the raw material of the compound represented by the general formula (I) corresponds to $R_1$ in the general formula (I). For example, when hexamethylene diisocyanate is used, $R_1$ indicates a hexamethylene group [$CH_2CH_2CH_2CH_2CH_2CH_2$ group]. As the diisocyanate which can be used according to aspects of the present invention, in particular, an aliphatic diisocyanate, an alicyclic diisocyanate, an aromatic diisocyanate, and an araliphatic diisocyanate may be mentioned. As the aliphatic diisocyanate, for example, tetramethylene diisocyanate, dodecamethylene diisocyanate, hexamethylene diisocyanate, 2,2,4-trimethyl hexamethylene diisocyanate, 2,4,4-trimethyl hexamethylene diisocyanate, lysine diisocyanate, 2-methylpentane-1,5-diisocyanate, and 3-methylpentane-1,5-diisocyanate may be mentioned. As the alicyclic diisocyanate, for example, isophorone diisocyanate, hydrogenated xylylene diisocyanate, 4,4-dicyclohexylmethane diisocyanate, 1,4-cyclohexane diisocyanate, methyl cyclohexylene diisocyanate, and 1,3-bis(isocyanatemethyl)cyclohexane may be mentioned. As the aromatic diisocyanate, for example, tolylene diisocyanate, 2,2-diphenylmethane diisocyanate, 2,4-diphenylmethane diisocyanate, 4,4-diphenylmethane diisocyanate, 4,4-dibenzyl diisocyanate, 1,5-naphthylene diisocyanate, xylylene diisocyanate, 1,3-phenylene diisocyanate, and 1,4-phenylene diisocyanate may be mentioned. As the araliphatic diisocyanate, for example, a dialkyldiphenylmethane diisocyanate, a tetraalkyldiphenylmethane diisocyanate, and α,α,α,α-tetramethyl xylylene diisocyanate may be mentioned. Those diisocyanates mentioned above may be used alone or in combination. According to aspects of the present invention, among those diisocyanates mentioned above, in particular, isophorone diisocyanate and hexamethylene diisocyanate may be used.

(2) Polyethylene Glycol Monoalkyl Ether

The polyethylene glycol monoalkyl ether used as the raw material of the compound represented by the general formula (I) is represented by the following general formula (III).

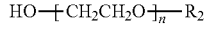

General formula (III)

In the general formula (III), $R_2$ indicates an alkyl group having 1 to 5 carbon atoms. $R_2$ may be substituted with an alkyl group having 1 to 3 carbon atoms. In addition, n is 4 or more and 70 or less.

The polyethylene glycol monoalkyl ether is obtained by performing ring-opening polymerization of ethylene oxide (1,2-epoxyethane) using an alkyl alcohol having 1 to 5 carbon atoms as a starting compound. In this case, an alkyl group other than a hydroxyl group of the alkyl alcohol used as a starting compound corresponds to $R_2$ in the general formula (III). For example, when ethanol [$CH_3CH_2OH$] is used as a starting compound, $R_2$ indicates an ethyl group [$CH_3CH_2$ group]. As the alkyl alcohol having 1 to 5 carbon atoms used as a starting compound, a saturated alkyl alcohol having 1 to 5 carbon atoms, such as methanol, ethanol, propanol, or butanol; or an unsaturated alkyl alcohol having 2 or 3 carbon atoms such as allyl alcohol may be mentioned. The alkyl alcohol mentioned above may be substituted with an alkyl group having 1 to 3 carbon atoms. When the present inventors compared between polyethylene glycol monoalkyl ethers having different types of $R_2$, it was found that if having the equivalent number of repeating units of the ethylene oxide structure, the above polyethylene glycol monoalkyl ethers have the equivalent hydrophilicity regardless of the $R_2$ structure. According to aspects of the present invention, among the polyethylene glycol monomethyl ethers mentioned above, in particular, the compound represented by the general formula (I), may be synthesized using a polyethylene glycol monomethyl ether having a methyl group as $R_2$.

In addition, when a polyethylene glycol monoalkyl ether is obtained, ring-opening polymerization may also be performed using, besides ethylene oxide, an alkylene oxide (such as propylene oxide (1,2-epoxypropane)) other than ethylene oxide. In this case, the alkylene oxide other than ethylene oxide may be used at a proportion of less than 50 percent by mole (and more than 0 percent by mole) with respect to all the alkylene oxides including ethylene oxide.

Among the compounds represented by the general formula (I), in particular, a compound represented by the following general formula (IV) may be used.

General formula (IV)

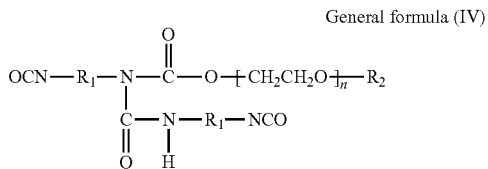

In the general formula (IV), $R_1$ indicates an alkylene group having 6 to 10 carbon atoms, a cycloalkylene group having 6 to 14 carbon atoms, or an arylene group having 6 to 16 carbon atoms. $R_2$ indicates an alkyl group having 1 to 5 carbon atoms. n is 4 or more and 70 or less. In addition, $R_1$ and $R_2$ may be substituted with an alkyl group having 1 to 3 carbon atoms.

(3) Synthetic Method of Compound Represented by General Formula (I)

The compound represented by the general formula (I) can be synthesized, for example, by the method disclosed in Japanese Patent Laid-Open No. 2006-022132. In particular, the synthesis is performed as described below. First, a polyethylene glycol monoalkyl ether and a diisocyanate are fed to perform a urethane forming reaction. In this step, the amount proportion on a molar basis of the polyethylene glycol monoalkyl ether to the diisocyanate may be set to 1:5 to 1:20. Subsequently, an allophanate forming catalysts, such as a metal salt of a carboxylic acid, is added to perform an allophanate forming reaction. Furthermore, a reaction terminator, such as phosphoric acid, is added to stop the allophanate forming reaction, and unreacted diisocyanate compound is removed by a thin-film distillation to obtain a target compound. In addition, as the allophanate forming catalyst, for example, a zirconium carboxylate or a tin carboxylate may be mentioned.

(Polyisocyanates Other than Compound Represented by General Formula (I))

The polyurethane polymer used for the ink according to aspects of the present invention further has a unit derived from a polyisocyanate other than the compound represented by the general formula (I). According to aspects of the present invention, the polyisocyanate indicates a compound having at least two isocyanate groups. In particular, for example, a diisocyanate having two isocyanate groups and a polyisocyanate, such as a triisocyanate, having at least three isocyanate groups may be mentioned. Those polyisocyanates mentioned above may be used alone or in combination. As the diisocyanate, the compounds mentioned by way of example in the "(1) diisocyanate" which is the raw material of the compound represented by above general formula (I) may be used. As the polyisocyanate having at least three isocyanate groups, for example, an isocyanurate type polyisocyanate, which is a polymer of diisocyanate, a biuret type polyisocyanate, an adduct type polyisocyanate may be mentioned. If the polyisocyanate having at least three isocyanate groups is used, since a polyurethane polymer obtained therefrom has a cross-linking structure, the scratch resistance of image and the highlighter resistance thereof are significantly improved, but the balance with the ink ejection stability is not easily obtained. Therefore, according to aspects of the present invention, as the polyisocyanate other than the compound represented by the general formula (I), a diisocyanate may be used since the balance of the scratch resistance of image and the highlighter resistance thereof with the ink ejection stability can be easily obtained.

(Polyol)

The polyurethane polymer used for the ink according to aspects of the present invention has the unit derived from a polyol. As the polyol, for example, a polyester polyol, a polyether polyol, a polycarbonate diol, and other polyols (such as, a polyhydroxy polyacetal, a polyhydroxy polyacrylate, a polyhydroxy polyester amide, and a polyhydroxy polythioether) may be mentioned. Those polyols mentioned above may be used alone or in combination. According to aspects of the present invention, the polyol may have 10 carbon atoms or more. In addition, it may be the case that no acid group is contained in the molecule. Furthermore, the number average molecular weight of the polyol may be 600 or more and 4,000 or less. When the number average molecular weight is less than 600, the film flexibility is degraded, and a sufficient effect of improving the scratch resistance of image and the highlighter resistance thereof may not be obtained in some cases. In addition, when the number average molecular weight is more than 4,000, the film flexibility is excessively increased, and a sufficient effect of improving the scratch resistance of image and the highlighter resistance thereof may not be obtained in some cases. As the polyester polyol, for example, an ester formed from an acid component and one of a polyalkylene glycol, a divalent alcohol, and a polyalcohol having at least trivalence may be mentioned. As the acid component forming a polyester polyol, for example, an aromatic dicarboxylic acid, an alicyclic dicarboxylic acid, and an aliphatic dicarboxylic acid may be mentioned. As the aromatic dicarboxylic acid, for example, isophthalic acid, terephthalic acid, orthophthalic acid, naphthalene dicarboxylic acid, biphenyl dicarboxylic acid, and tetrahydrophthalic acid may be mentioned. As the alicyclic dicarboxylic acid, for example, hydrogenated compound of the above aromatic dicarboxylic acid may be mentioned. As the aliphatic dicarboxylic acid, for example, malonic acid, succinic acid, tartaric acid, oxalic acid, glutaric acid, adipic acid, pimelic acid, suberic acid, azelaic acid, sebacic acid, alkyl succinic acid, maleic acid, fumaric acid, mesaconic acid, citraconic acid, and itaconic acid may be mentioned. In addition, for example, a reactive derivative, such as an acid anhydride, an alkyl ester, or an acid halide, of the acid component mentioned above may also be used as the acid component forming a polyester polyol. Furthermore, the acid components forming a polyester polyol mentioned above may be used alone or in combination.

In addition, as the polyalkylene glycol, for example, a polyethylene glycol, a polypropylene glycol, a polytetramethylene glycol, and an ethylene glycol-propylene glycol copolymer may be mentioned. As the divalent alcohol, for example, hexamethylene glycol, tetramethylene glycol, ethylene glycol, diethylene glycol, propylene glycol, dipropylene glycol, 1,3-butanediol, 1,4-butanediol, 4,4-dihydroxydiphenyl propane, and 4,4-dihydroxydiphenyl methane may be mentioned. As the polyalcohol having at least trivalence, for example, glycerin, trimethylolpropane, 1,2,5-hexanetriol, 1,2,6-hexanetriol, and pentaerythritol may be mentioned. Those polyester polyols mentioned above may be uses alone or in combination.

As the polyether polyol, for example, a polyalkylene glycol and an addition polymer formed from an alkylene oxide and a divalent alcohol or a polyalcohol having at least trivalence may be mentioned. As the alkylene oxide, for example, ethylene oxide, propylene oxide, butylene oxide, α-olefin oxide may be mentioned. As the polyalkylene glycol, the divalent alcohol, or the polyalcohol having at least trivalence, for example, the components each forming the polyester polyol mentioned above by way of example may be used. Those polyether polyols mentioned above may be used alone or in combination. As the polycarbonate diol, a polycarbonate diol manufactured by a known method may be used. For example, a poly(hexamethylene carbonate) diol, which is a hexanediol-based polycarbonate diol, may be mentioned. In addition, for example, polycarbonate diols each obtained by a reaction between an aliphatic diol component and a carbonate component, such as an alkylene carbonate, a diaryl carbonate, or a dialkyl carbonate, or phosgene may also be mentioned. Those polycarbonate diols mentioned above may be used alone or in combination.

In particular, according to aspects of the present invention, among the polyols mentioned above, the polyether polyol may be used. Since the flexibility of the polyurethane polymer may be appropriately obtained when the polyether polyol is used, the scratch resistance of image and the highlighter resistance thereof are improved. Furthermore, since the polyether polyol has relatively high water solubility, the ink ejection stability is also excellent. Among the polyether polyols, for example, a polypropylene glycol may be used. Through the investigation carried out by the present inventors, it was confirmed that the water solubility of the polyurethane polymer is improved when a polypropylene glycol is used, and the ink ejection stability is further improved. In addition, the proportion (percent by mass) of the unit derived from a polyol in the polyurethane polymer may be 5.0 percent by mass or more and 60.0 percent by mass or less.

(Diol Having Acid Group)

The polyurethane polymer used for the ink according to aspects of the present invention has a unit derived from a diol having an acid group. The "diol having an acid group" according to aspects of the present invention indicates a diol having an acid group, such as a carboxyl group, a sulfonic group, or a phosphate group, in its molecule. The diol having an acid group may be a diol of a short chain having less than 10 carbon atoms. As the diol having an acid group, for example, dimethylol acetic acid, dimethylol propionic acid, and dimethylol butanoic acid may be mentioned. In particular, at least one of dimethylol propionic acid and dimethylol butanoic acid may be used. Those diols each having an acid group may be used alone or in combination. In addition, since the acid value of the polyurethane polymer is dependent on the amount of the unit derived from a diol having an acid group, when the polymer is synthesized, the amount of the diol having an acid group may be adjusted so that the polyurethane polymer has a predetermined acid value. The proportion (percent by mass) of the unit derived from a diol having an acid group in the polyurethane polymer may be 2.0 percent by mass or more and 40.0 percent by mass or less. In addition, the proportion (percent by mole) of the unit derived from a diol having an acid group in the polyurethane polymer may be 0.9 times or more and 4.8 times or less the proportion of the unit derived from the compound represented by the general formula (I) on a molar rate basis.

(Chain Extension Agent)

A chain extension agent is a compound to react with a remaining isocyanate group, which forms no urethane bonds, of the polyisocyanate units of a urethane prepolymer. As the chain extension agent which can be used when the polyurethane polymer used for the ink according to aspects of the present invention is synthesized, for example, there may be mentioned trimethylolmelamine and its derivative, dimethylolurea and its derivative, dimethylolethylamine, diethanolmethylamine, dipropanolethylamine, dibutanolmethylamine, polyamine compounds, such as ethylenediamine, propylenediamine, diethylenetriamine, hexylenediamine, triethylenetetramine, tetraethylenepentamine, isophoronediamine, xylylenediamine, diphenylmethanediamine, hydrogenated diphenylmethanediamine, and hydrazine, a polyamidepolyamine, and a polyethylenepolyimine. Those chain extension agents mentioned above may be used alone or in combination.

(Properties of Polyurethane Polymer)

The acid value of the polyurethane polymer used for the ink according to aspects of the present invention can be controlled by the proportion of the unit derived from a diol having an acid group and must be 20 mgKOH/g or more and 100 mgKOH/g or less as described above. The polystyrene-conversion weight average molecular weight (Mw) of the polyurethane polymer used for the ink according to aspects of the present invention obtained by gel permeation chromatography (GPC) may be 5,000 or more and 50,000 or less. The proportion (percent by mass) of a polyethylene glycol structure in the polyurethane polymer used for the ink according to aspects of the present invention may be 10 percent by mass or more and 50 percent by mass or less based on the total mass of the polyurethane polymer. In addition, according to aspects of the present invention, the polyethylene glycol structure is the structure represented by the following general formula (II) and is introduced into the polyurethane polymer by synthesizing a polyurethane polymer using a polyethylene glycol as a polyol and the compound represented by the general formula (I).

General formula (II)

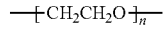

In general formula (II), n is 4 or more and 70 or less. Since the polyethylene glycol structure has a significantly high hydrophilicity as compared to that of other polyalkylene glycol structures (such as a propylene glycol), the proportion of the polyethylene glycol structure has a significant influence on the hydrophilicity/hydrophobicity of the polyurethane polymer. Therefore, as described above, when the proportion of the polyethylene glycol structure in the polyurethane polymer is set in a predetermined range, an effect according to aspects of the invention can be obtained. Since the hydrophobicity of the polyurethane polymer is increased when the proportion (percent by mass) of the above polyethylene glycol structure is less than 10 percent by mass, the effect of suppressing the image deflection caused by the face wetting may not be sufficiently obtained in some cases. Since the hydrophilicity of the polyurethane polymer is increased when the above proportion is more than 50 percent by mass, the effect of improving the scratch resistance of image and the highlighter resistance thereof may not be sufficiently obtained in some cases.

According to aspects of the present invention, the content (percent by mass) of the polyurethane polymer in the ink may be less than 2.0 percent by mass based on the total mass of the ink. The content may be 0.1 percent by mass or more and less than 2.0 percent by mass. When the content is less than 0.1 percent by mass, the effect of improving the scratch resistance of image and the highlighter resistance thereof may not be sufficiently obtained in some cases. When the content is 2.0 percent by mass or more, the effect of improving the ink ejection stability and the effect of suppressing the image deflection caused by the face wetting may not be sufficiently obtained in some cases.

In addition, the mass ratio of the content (percent by mass) of the polyurethane polymer to the content (percent by mass) of the pigment relative to the total mass of the ink is 0.10 times or more and 2.00 times or less. Since the content of the polyurethane polymer to that of the pigment is relatively decreased when the mass ratio is less than 0.10 times, the effect of improving the scratch resistance of image and the highlighter resistance thereof may not be sufficiently obtained in some cases. Since the content of the polyurethane polymer is increased when the mass ratio is more than 2.00 times, the effect of improving the ink ejection stability may not be sufficiently obtained in some cases.

(Synthetic Method of Polyurethane Polymer)

As a synthetic method of the polyurethane polymer used for the ink according to aspects of the present invention, although a method generally used in the past, such as a one-shot method or a multi-stage method, may be used, the following method may also be used. First, after a polyol is dissolved in an organic solvent, such as methyl ethyl ketone, by sufficient stirring, as monomers, the compound represented by the general formula (I), a polyisocyanate, and a diol having an acid group are added to perform a reaction therebetween, so that a urethane prepolymer solution is obtained. Subsequently, after the urethane prepolymer solution thus obtained is neutralized, ion exchange water is added thereto, and emulsification is performed by high-speed stirring using a homomixer. A chain extension agent is added after the emulsification to perform a chain elongation reaction.

(Analytical Method of Polyurethane Polymer)

The composition, the molecular weight, and the acid value of the polyurethane polymer used for the ink according to aspects of the present invention can be analyzed by commonly known methods. That is, when the ink is centrifuged, and its sediment and supernatant are examined, the properties mentioned above can be confirmed. Since the pigment is insoluble to an organic solvent, the polyurethane polymer may also be separated by solvent extraction. Although the above properties can be confirmed in the state of ink, when the polyurethane polymer is once extracted, the accuracy of the measurement is further improved. As a particular method, when the ink is centrifuged at 80,000 rpm, and its supernatant is measured by a Fourier-transformer infrared spectroscopy (FT-IR) device, the types of polyisocyanate and polyol can be identified from intrinsic absorption wavelengths of the urethane bond. In addition, after the supernatant is processed by acid precipitation using hydrochloric acid or the like, the acid precipitated product is dried and dissolved in chloroform or the like, and measurement thereof is then performed using a nuclear magnetic resonance (NMR) method, so that the molecular weight of the polyol can be determined. Furthermore, the acid value of the polyurethane polymer can be measured by a titration method. In the examples which will be described later, a polymer is dissolved in tetrahydrofuran (THF), and potentiometric titration is performed by a potassium hydroxide ethanol titrant using an automatic potentiometric titrator AT510 (manufactured by Kyoto Electronics Manufacturing Co., Ltd.), so that the acid value can be measured. In addition, the weight average molecular weight and the number average molecular weight of the polyurethane polymer can be obtained by GPC. The measurement conditions of GPC according to aspects of the present invention are as follows.

Apparatus: Alliance GPC 2695 (manufactured by Waters Co.)
Column: four columns in series of Shodex KF-806M (manufactured by Showa Denko K. K.)
Mobile phase: THF (reagent grade)
Flow rate: 1.0 mL/min
Oven temperature: 40.0° C.
Amount of sample solution: 0.1 mL
Detector: RI (refractive index)
Polystyrene standard sample: PS-1 and PS-2 (manufactured by Polymer Laboratories Inc.)
(Molecular weight: 17 types: 7,500,000, 2,560,000, 841,700, 377,400, 320,000, 210,500, 148,000, 96,000, 59,500, 50,400, 28,500, 20,650, 10,850, 5,460, 2,930, 1,300, and 580.)

In the examples which will be described later, measurement was also performed under the above conditions.

<Pigment>

As the pigment used for the ink according to aspects of the present invention, for example, there may be mentioned polymer dispersion type pigments each using a polymer as a dispersant (a polymer dispersion pigment using a polymer dispersant, a microcapsule pigment in which surfaces of pigment particles are covered with a polymer, and a polymer-attach pigment in which an organic group included in a polymer is chemically bonded to surfaces of pigment particles) and a self dispersing type pigment (self-dispersing pigment) in which a hydrophilic group (acid group) is bonded directly to surfaces of pigment particles or indirectly thereto with another atomic group provided therebetween. In the case of the polymer dispersion type pigment, although a polyurethane polymer may also be used as a dispersant, but a dispersant different from a polyurethane polymer may be dispersed in advance. As the pigment which can be used for the ink according to aspects of the present invention, for example, inorganic pigments, such as carbon black, and organic pigments may be mentioned, and any known pigments usable for an ink jet ink may also be used. The content (percent by mass) of the pigment in the ink may be 0.1 percent by mass or more and 15.0 percent by mass or less based on the total mass of the ink and may even be 1.0 percent by mass or more and 10.0 percent by mass or less. When the content is less than 0.1 percent by mass, the image density may not be sufficiently obtained in some cases. When the content is more than 15.0 percent by mass, the ink jet properties, such as adhesion resistance, may not be sufficiently obtained in some cases.

<Aqueous Medium>

For the ink according to aspects of the present invention, water or an aqueous medium which is a mixed solvent of water and a water soluble organic solvent may be used. The content (percent by mass) of the water soluble organic solvent in the ink may be 3.0 percent by mass or more and 50.0 percent by mass or less based on the total mass of the ink. As the water soluble organic solvent, any solvents used for the ink jet ink in the past may be used. For example, an alcohol, a glycol, an alkylene glycol in which an alkylene group has 2 to 6 carbon atoms, a polyethylene glycol, a nitrogen-containing compound, and a sulphur-containing compound may be mentioned. Those water soluble organic solvents may be used alone or in combination. As the water, deionized water (ion exchange water) may be used. The content (percent by mass) of the water in the ink may be 50.0 percent by mass or more and 95.0 percent by mass or less based on the total mass of the ink.

<Other Additives>

Besides the above components, the ink according to aspects of the present invention may also optionally contain a water-soluble solid organic compound at ordinary temperature, such as a polyalcohol including trimethylolpropane or trimethylolethane, urea, or a urea derivative including ethylene urea. Furthermore, the ink according to aspects of the present invention may also optionally contain various additives, such as a polymer other than the above polyurethane polymer, a surfactant, a pH adjustor, an antirust agent, an antiseptic, a fungicide, an antioxidant, a reduction inhibitor, an evaporation promoter, and a chelating agent. When the ink further contains a polymer other than the polyurethane polymer, based on the total mass of the ink, the total content of all the polymers in the ink may be 0.01 percent by mass or more and 10.0 percent by mass or less.

[Ink Cartridge]

An ink cartridge according to aspects of the present invention comprises an ink storage portion which stores an ink, and the ink according to aspects of the present invention described above is stored in the ink storage portion. As the structure of the ink cartridge, there may be mentioned an ink storage portion formed of an ink storage chamber to store a liquid ink and a negative pressure generation-member storage chamber to store a negative pressure generation member which holds an ink therein with a negative pressure. In addition, there may be used an ink cartridge which has an ink storage portion formed to hold the entire storage amount therein by a negative pressure generation member and has no ink storage chamber storing a liquid ink. Furthermore, an ink cartridge formed to have an ink storage portion and a recording head may also be used.

[Ink Jet Recording Method]

An ink jet recording method according to aspects of the present invention is an ink jet recording method comprising a step of ejecting an ink from an ink jet recording head to perform recording on a recording medium and uses the above-described ink according to aspects of the present invention in the above recording step. The recording head may have a face having a contact angle of 90° or more with pure water. In particular, according to aspects of the present invention, an ink jet recording method may be used which ejects an ink from an ink ejection orifice of a recording head by applying thermal energy to the ink. In addition, the "recording" in according to aspects of the present invention includes a mode in which recording is performed on a recording medium having an ink receiving layer or a recording medium, such as regular paper, using the ink according to aspects of the present invention and a mode in which recording is performed on a non-permeable recording medium, such as a glass, a plastic, or a film, using the ink according to aspects of the present invention.

EXAMPLES

Hereinafter, the present invention will be described in more detail using examples and comparative examples. However, within the scope of the present invention, the present invention is not limited at all by the following examples. In addition, in the following examples, the "part(s)" is on a mass basis unless otherwise particularly noted. The abbreviations are as follows.

IPDI: Isophorone diisocyanate
HDI: Hexamethylene diisocyanate
PPG: Polypropylene glycol (number average molecular weight: 2,000)
PTMG: Polytetramethylene glycol (number average molecular weight: 2,000)
PE: Phthalic acid-based polyester polyol (number average molecular weight: 2,000)
PC: Hexanediol-based polycarbonate diol (number average molecular weight: 2,000)
PEG: Polyethylene glycol (number average molecular weight: 2,000)
DMPA: Dimethylol propionic acid
DMBA: Dimethylol butanoic acid
EDA: Ethylenediamine <Synthesis of Compound Represented by General Formula (I)>

(Synthesis of Compound ALP-1 Represented by General Formula (I))

To a reactor equipped with a stirrer, a thermometer, a condenser, and a nitrogen gas introducing pipe, hexamethylene diisocyanate (863 g), polyethylene glycol monomethyl ether (number average molecular weight: 600, degree of polymerization n: 13) (137 g), and zirconium 2-ethylhexanoate (0.2 g) were supplied, and a reaction was performed at 90° C. for 2 hours. Subsequently, 0.1 g of phosphoric acid was added, and a terminal reaction was performed at 50° C. for 1 hour. The isocyanate content of a reaction product after the terminal reaction was 40.2%. A compound ALP-1 represented by the general formula (I) was obtained by performing thin-film distillation of this reaction product at 130° C. and 0.04 kPa. When ALP-1 was measured by FT-IR, a urethane bond was hardly confirmed but the presence of an allophanate bond was confirmed.

(Synthesis of Compound ALP-2 Represented by General Formula (I))

To a reactor equipped with a stirrer, a thermometer, a condenser, and a nitrogen gas introducing pipe, isophorone diisocyanate (880 g), polyethylene glycol monomethyl ether (number average molecular weight: 600, degree of polymerization n: 13) (120 g), and zirconium 2-ethylhexanoate (0.2 g) were supplied, and a reaction was performed at 90° C. for 2 hours. Subsequently, 0.1 g of phosphoric acid was added, and a terminal reaction was performed at 50° C. for 1 hour. The isocyanate content of a reaction product after the terminal reaction was 40.2%. A compound ALP-2 represented by the general formula (I) was obtained by performing thin-film distillation of this reaction product at 130° C. and 0.04 kPa. When ALP-2 was measured by FT-IR, a urethane bond was hardly confirmed but the presence of an allophanate bond was confirmed.

<Preparation of Polyurethane Polymer Dispersion>
(Preparation of Polyurethane Polymer Dispersions PU-1 to PU-21)

Polyurethane polymer dispersions PU-1 to PU-21 were prepared by the following methods. The preparation conditions of each of the polyurethane polymer dispersions are as shown in Table 1. First, after a polyol was dissolved in methyl ethyl ketone by sufficient stirring, the above synthesized compound represented by the general formula (I), a polyisocyanate, and a diol having an acid group were added thereto, and a reaction was performed at 75° C. for 1 hour, so that a urethane prepolymer solution was obtained. Subsequently, after the urethane prepolymer solution thus obtained was cooled to 60° C., and a potassium hydroxide aqueous solution was added to neutralize the acid group, the solution thus prepared was cooled to 40° C., ion exchange water was added thereto, and high-speed stirring was then performed by a homomixer for emulsification. A chain extension agent was added after the emulsification, and a chain elongation reaction was performed at 30° C. for 12 hours. When the presence of an isocyanate group is no longer confirmed by FT-IR, this polymer solution was heated under reduced-pressure conditions to remove methyl ethyl ketone by distillation, so that a polyurethane polymer dispersion was obtained having a polyurethane polymer content (solid content) of 20.0 percent by mass and a weight average molecular weight of 20,000. The composition and properties of the polyurethane polymer thus obtained are shown in Table 2. In this case, as described above, the composition of the polyurethane polymer was computed using FT-IR and NMR. In addition, the acid value was measured by the above-described potentiometric titration using a potassium hydroxide ethanol titrant.

(Preparation of Polyurethane Polymer Dispersion PU-22)

With reference to synthetic example 6 disclosed in the example of Japanese Patent Laid-Open No. 2010-195944, a polyurethane polymer dispersion PU-22 was obtained having a polyurethane polymer content (solid content) of 20.0 percent by mass and a weight average molecular weight of 20,000. The preparation conditions are shown in Table 1, and the composition and properties of the polyurethane polymer thus obtained are shown in Table 2.

(Preparation of Polyurethane Polymer Dispersion PU-23)

With reference to synthetic example 4 disclosed in the example of Japanese Patent Laid-Open No. 2010-195944, a polyurethane polymer dispersion PU-23 was obtained having a polyurethane polymer content (solid content) of 20.0 percent by mass and a weight average molecular weight of 20,000. The preparation conditions are shown in Table 1, and the composition and properties of the polyurethane polymer thus obtained are shown in Table 2.

TABLE 1

PREPARATION CONDITIONS OF POLYURETHANE (PU) POLYMER DISPERSION

| PU POLYMER DISPERSION NO. | COMPOUND REPRESENTED BY GENERAL FORMULA (I) TYPE (PARTS) | POLYISOCYANATE TYPE (PARTS) | POLYOL TYPE (PARTS) | DIOL HAVING ACID GROUP TYPE (PARTS) | CHAIN EXTENSION AGENT TYPE (PARTS) |
|---|---|---|---|---|---|
| PU-1 | ALP-1 485.6 | IPDI 115.3 | PPG 303.6 | DMPA 95.5 | EDA 10.4 |
| PU-2 | ALP-1 485.6 | IPDI 115.3 | PTMG 303.6 | DMPA 95.5 | EDA 10.4 |
| PU-3 | ALP-1 485.6 | IPDI 115.3 | PE 303.6 | DMPA 95.5 | EDA 10.4 |
| PU-4 | ALP-1 485.6 | IPDI 115.3 | PC 303.6 | DMPA 95.5 | EDA 10.4 |
| PU-5 | ALP-1 347.0 | IPDI 82.4 | PPG 522.8 | DMPA 47.8 | EDA 7.4 |
| PU-6 | ALP-1 488.8 | IPDI 270.9 | PPG 49.2 | DMPA 191.1 | EDA 17.4 |
| PU-7 | ALP-1 485.6 | IPDI 115.3 | PPG PEG 151.8 151.8 | DMPA 95.5 | EDA 10.4 |
| PU-8 | ALP-1 143.1 | IPDI 227.4 | PPG 534.0 | DMPA 95.9 | EDA 10.4 |
| PU-9 | ALP-1 153.5 | IPDI 224.0 | PPG 527.0 | DMPA 95.5 | EDA 11.7 |
| PU-10 | ALP-1 775.6 | IPDI 20.5 | PPG 108.4 | DMPA 95.5 | EDA 9.2 |
| PU-11 | ALP-1 794.7 | IPDI 14.2 | PPG 95.6 | DMPA 95.5 | EDA 9.1 |
| PU-12 | ALP-1 837.5 | — 0 | PPG 67.0 | DMPA 95.5 | EDA 9.0 |
| PU-13 | ALP-2 529.2 | IPDI 112.7 | PPG 262.6 | DMPA 95.5 | EDA 10.1 |
| PU-14 | ALP-1 491.6 | HDI 88.3 | PPG 324.6 | DMPA 95.5 | EDA 10.5 |
| PU-15 | ALP-1 483.6 | IPDI 114.8 | PPG 296.1 | DMBA 105.5 | EDA 10.3 |
| PU-16 | — 0 | IPDI 274.3 | PPG 630.2 | DMPA 95.5 | EDA 12.4 |
| PU-17 | — 0 | IPDI 587.4 | PPG 126.0 | DMPA 286.6 | EDA 26.5 |
| PU-18 | ALP-1 340.1 | IPDI 80.8 | PPG 533.7 | DMPA 45.4 | EDA 7.3 |
| PU-19 | ALP-1 208.2 | IPDI 444.9 | PPG 105.7 | DMPA 241.2 | EDA 22.3 |

TABLE 1-continued

PREPARATION CONDITIONS OF POLYURETHANE (PU) POLYMER DISPERSION

| PU POLYMER DISPERSION NO. | COMPOUND REPRESENTED BY GENERAL FORMULA (I) TYPE (PARTS) | POLYISOCYANATE TYPE (PARTS) | POLYOL TYPE (PARTS) | DIOL HAVING ACID GROUP TYPE (PARTS) | CHAIN EXTENSION AGENT TYPE (PARTS) |
|---|---|---|---|---|---|
| PU-20 | — | IPDI | PEG | DMPA | EDA |
|  | 0 | 274.3 | 630.2 | 95.5 | 12.4 |
| PU-21 | ALP-1 | IPDI | PPG | — | EDA |
|  | 208.4 | 49.5 | 742.1 | 0 | 4.5 |
| PU-22 | ALP-1 | — | PC | DMPA | EDA |
|  | 638.4 | 0 | 318.9 | 42.8 | 6.3 |
| PU-23 | ALP-1 | IPDI | PC | DMPA | EDA |
|  | 123.8 | 196.3 | 649.4 | 30.5 | 8.6 |

TABLE 2

COMPOSITION AND PROPERTIES OF POLYURETHANE (PU) POLYMER DISPERSION

| PU POLYMER DISPERSION NO. | POLYISOCYANATE COMPOUND OF GENERAL FORMULA (I) TYPE (mass %) (mol %) | POLYISOCYANATE OTHER THAN COMPOUND OF GENERAL FORMULA (I) TYPE (mass %) (mol %) | POLYOL TYPE (mass %) (mol %) | DIOL HAVING ACID GROUP TYPE (mass %) (mol %) | CHAIN EXTENSION AGENT TYPE (mass %) (mol %) |
|---|---|---|---|---|---|
| PU-1 | ALP-1 | IPDI | PPG | DMPA | EDA |
|  | 48.6 | 11.41 | 30.05 | 9.45 | 1.03 |
|  | 24.67 | 25.12 | 7.35 | 34.48 | 8.38 |
| PU-2 | ALP-1 | IPDI | PTMG | DMPA | EDA |
|  | 48.06 | 11.41 | 30.05 | 9.45 | 1.03 |
|  | 24.67 | 25.12 | 7.35 | 34.48 | 8.38 |
| PU-3 | ALP-1 | IPDI | PE | DMPA | EDA |
|  | 48.06 | 11.41 | 30.05 | 9.45 | 1.03 |
|  | 24.67 | 25.12 | 7.35 | 34.48 | 8.38 |
| PU-4 | ALP-1 | IPDI | PC | DMPA | EDA |
|  | 48.06 | 11.41 | 30.05 | 9.45 | 1.03 |
|  | 24.67 | 25.12 | 7.35 | 34.48 | 8.38 |
| PU-5 | ALP-1 | IPDI | PPG | DMPA | EDA |
|  | 34.45 | 8.18 | 51.90 | 4.74 | 0.73 |
|  | 24.67 | 25.13 | 17.71 | 24.15 | 8.34 |
| PU-6 | ALP-1 | IPDI | PPG | DMPA | EDA |
|  | 48.04 | 26.63 | 4.84 | 18.78 | 1.71 |
|  | 14.77 | 35.12 | 0.71 | 41.05 | 8.34 |
| PU-7 | ALP-1 | IPDI | PPG   PEG | DMPA | EDA |
|  | 48.06 | 11.41 | 15.02   15.02 | 9.45 | 1.03 |
|  | 24.67 | 25.12 | 7.35 | 34.48 | 8.38 |
| PU-8 | ALP-1 | IPDI | PPG | DMPA | EDA |
|  | 14.16 | 22.50 | 52.83 | 9.49 | 1.03 |
|  | 6.45 | 43.95 | 11.47 | 30.71 | 7.43 |
| PU-9 | ALP-1 | IPDI | PPG | DMPA | EDA |
|  | 15.17 | 22.14 | 52.09 | 9.44 | 1.16 |
|  | 6.88 | 43.09 | 11.27 | 30.44 | 8.32 |
| PU-10 | ALP-1 | IPDI | PPG | DMPA | EDA |
|  | 76.85 | 2.03 | 10.74 | 9.46 | 0.91 |
|  | 44.58 | 5.05 | 2.97 | 39.01 | 8.39 |
| PU-11 | ALP-1 | IPDI | PPG | DMPA | EDA |
|  | 78.75 | 1.41 | 9.47 | 9.46 | 0.90 |
|  | 46.09 | 3.53 | 2.64 | 39.37 | 8.37 |
| PU-12 | ALP-1 | — | PPG | DMPA | EDA |
|  | 83.00 | 0.00 | 6.64 | 9.46 | 0.89 |
|  | 49.53 | 0.00 | 1.89 | 40.14 | 8.44 |
| PU-13 | ALP-2 | IPDI | PPG | DMPA | EDA |
|  | 52.39 | 11.16 | 26.00 | 9.45 | 1.00 |
|  | 24.72 | 25.14 | 6.51 | 35.30 | 8.33 |

TABLE 2-continued

COMPOSITION AND PROPERTIES OF POLYURETHANE (PU) POLYMER DISPERSION

| | | | | | |
|---|---|---|---|---|---|
| PU-14 | ALP-1 | HDI | PPG | DMPA | EDA |
| | 48.65 | 8.74 | 32.12 | 9.45 | 1.04 |
| | 24.68 | 25.12 | 7.77 | 34.07 | 8.36 |
| PU-15 | ALP-1 | IPDI | PPG | DMBA | EDA |
| | 47.87 | 11.36 | 29.31 | 10.44 | 1.02 |
| | 24.68 | 25.13 | 7.20 | 34.65 | 8.34 |
| PU-16 | — | IPDI | PPG | DMPA | EDA |
| | 0 | 27.09 | 62.25 | 9.43 | 1.22 |
| | 0 | 50.02 | 12.77 | 28.85 | 8.36 |
| PU-17 | — | IPDI | PPG | DMPA | EDA |
| | 0 | 57.22 | 12.27 | 27.92 | 2.58 |
| | 0 | 50.02 | 1.19 | 40.44 | 8.35 |
| PU-18 | ALP-1 | IPDI | PPG | DMPA | EDA |
| | 33.76 | 8.02 | 52.98 | 4.51 | 0.72 |
| | 24.65 | 25.12 | 18.44 | 23.39 | 8.39 |
| PU-19 | ALP-1 | IPDI | PPG | DMPA | EDA |
| | 20.37 | 43.52 | 10.34 | 23.59 | 2.18 |
| | 4.92 | 45.06 | 1.19 | 40.48 | 8.35 |
| PU-20 | — | IPDI | PEG | DMPA | EDA |
| | 0 | 27.09 | 62.25 | 9.43 | 1.22 |
| | 0 | 50.02 | 12.77 | 28.85 | 8.36 |
| PU-21 | ALP-1 | IPDI | PPG | — | EDA |
| | 20.75 | 4.93 | 73.88 | 0 | 0.45 |
| | 24.64 | 25.10 | 41.82 | 0 | 8.44 |
| PU-22 | ALP-1 | — | PC | DMPA | EDA |
| | 63.44 | 0 | 31.69 | 4.25 | 0.62 |
| | 53.47 | 0 | 12.73 | 25.46 | 8.34 |
| PU-23 | ALP-1 | IPDI | PC | DMPA | EDA |
| | 12.3 | 19.5 | 64.4 | 3.0 | 0.8 |
| | 7.61 | 51.73 | 19.02 | 13.31 | 8.34 |

| PU POLYMER DISPERSION NO. | PROPERTIES | | |
|---|---|---|---|
| | PROPORTION OF UNIT DERIVED FROM COMPOUND OF FORMULA (I) IN POLYISOCYANATE (mol %) | MOLAR RATE OF PROPORTION OF UNIT DERIVED FROM DIOL HAVING ACID GROUP TO PROPORTION OF UNIT DERIVED FROM COMPOUND OF GENERAL FORMULA (I) (TIMES) | ACID VALUE (mgKOH/g) |
| PU-1 | 50 | 1.4 | 40 |
| PU-2 | 50 | 1.4 | 40 |
| PU-3 | 50 | 1.4 | 40 |
| PU-4 | 50 | 1.4 | 40 |
| PU-5 | 50 | 1.0 | 20 |
| PU-6 | 30 | 2.8 | 100 |
| PU-7 | 50 | 1.4 | 40 |
| PU-8 | 13 | 4.8 | 40 |
| PU-9 | 14 | 4.4 | 40 |
| PU-10 | 90 | 0.9 | 40 |
| PU-11 | 93 | 0.9 | 40 |
| PU-12 | 100 | 0.8 | 40 |
| PU-13 | 50 | 1.4 | 40 |
| PU-14 | 50 | 1.4 | 40 |
| PU-15 | 50 | 1.4 | 40 |
| PU-16 | 0 | — | 40 |
| PU-17 | 0 | — | 120 |
| PU-18 | 50 | 0.9 | 19 |
| PU-19 | 10 | 8.2 | 101 |
| PU-20 | 0 | — | 40 |
| PU-21 | 50 | 0 | 0 |
| PU-22 | 100 | 0.5 | 27 |
| PU-23 | 13 | 1.8 | 11 |

<Preparation of Pigment Dispersion>
(Preparation of Pigment Dispersion A)

Cab-O-Jet200 (manufactured by Cabot Corp.) commercially available as a self dispersing carbon black pigment in which a hydrophilic group was bonded to the surface of carbon black was diluted with water, followed by sufficient stirring, so that a pigment dispersion A was obtained. In the pigment dispersion A, the content (solid content) of the pigment was 10.0 percent by mass, the pH was 7.5, and the average particle diameter of the pigment was 135 nm.

(Preparation of Pigment Dispersion B)

A styrene/acrylic acid copolymer having an acid value of 200 mgKOH/g and a weight average molecular weight of 10,000 was neutralized with a potassium hydroxide aqueous solution at a concentration of 10 percent by mass. In addition, 10 parts of carbon black having a specific surface area of 210 $m^2/g$ and a DBP oil absorption of 74 mL/100 g, 20 parts of the neutralized styrene/acrylic acid copolymer (solid content), and 70 parts of water were mixed together. After this mixture was dispersed for 1 hour using a sand grinder, coarse and large particles were removed by a centrifugal treatment, and pressure filtration was then performed using a microfilter (manufactured by Fujifilm Corp.) having a pore size of 3.0 µm. By the method described above, a pigment dispersion B in the state in which carbon black was dispersed in water by the polymer was obtained. In the pigment dispersion B, the content of the pigment (solid content) was 10.0 percent by mass, the pH was 10.0, and the average particle diameter of the pigment was 120 nm.

(Preparation of Pigment Dispersion C)

To a solution containing 5 g of concentrated hydrochloric acid dissolved in 5.5 g of water, 1.5 g of 4-amino-1,2-benzenedicarboxylic acid in a cooled state at 5° C. was added. Next, a container storing this solution was placed in an ice bath so as to always keep the temperature of the solution at 10° C. or less, and a solution containing 1.8 g of sodium nitrite dissolved in 9 g of water at 5° C. was added to the above solution. After this solution was further stirred for 15 minutes, 6 g of carbon black having a specific surface area of 220 $m^2$/g and a DBP oil absorption of 105 mL/100 g was added under stirring conditions. Then, after the stirring was further performed for 15 minutes, and a slurry thus obtained was processed by filtration using filter paper (trade name: Standard Filter Paper No. 2; manufactured by Advantech Co., Ltd.), particles were sufficiently washed with water. The particles were dried at 110° C. in an oven, so that self dispersing carbon black was prepared. Furthermore, water was added to disperse the self dispersing carbon black thus obtained so that the content thereof was 10.0 percent by mass, thereby preparing a dispersion. By the method described above, a pigment dispersion was obtained which contained self dispersing carbon black particles dispersed in water, the surfaces of which were bonded with a —$C_6H_3$—$(COONa)_2$ group. Subsequently, sodium ions of the pigment dispersion were substituted with potassium ions by an ion exchange method, so that a pigment dispersion C was obtained which contained carbon black dispersed therein, the surface of which was bonded with a —$C_6H_3$—$(COOK)_2$ group. In addition, in the pigment dispersion C thus prepared, the content of the pigment (solid content) was 10.0 percent by mass, the pH was 8.0, and the average particle diameter of the pigment was 80 nm.

(Preparation of Pigment Dispersion D)

After 500 g of carbon black having a specific surface area of 220 $m^2$/g and a DBP oil absorption of 112 mL/100 g, 45 g of aminophenyl(2-sulfoethyl)sulfone, and 900 g of distilled water were supplied to a reactor, stirring was performed for 20 minutes at a temperature of 55° C. and at a rotation of 300 rpm. Then, after 40 g of sodium nitrite at a concentration of 25 percent by mass was dripped for 15 minutes, 50 g of distilled water was further added, and a reaction was performed at 60° C. for 2 hours. A reaction product thus obtained was recovered while being diluted with distilled water, and preparation was performed so that the solid content was 15.0 percent by mass. Furthermore, a centrifugal treatment and a purification treatment were performed to remove impurities, and as a result, a dispersion (1) was obtained. The carbon black in the dispersion (1) was in the state in which the functional group of aminophenyl(2-sulfoethyl)sulfone was bonded to the surface of the carbon black. The number of moles of the functional group bonded to the carbon black in the dispersion (1) was obtained as follows. The sodium ions in the dispersion (1) were measured with a probe type sodium electrode, and the value thus obtained was converted into a value per mole of carbon black powder, so that the number of moles of the functional group bonded to the carbon black was obtained. Next, the dispersion (1) was dripped in a pentaethylenehexamine solution. In this step, while the pentaethylenehexamine solution is vigorously stirred, and the temperature thereof is maintained at room temperature, the dispersion (1) was dripped over 1 hour. In this case, the content of pentaethylenehexamine was set to 1 to 10 times the number of moles of the sodium ions measured previously, and the amount of the solution was set equal to that of the dispersion (1). Furthermore, after this mixture was stirred for 18 to 48 hours, a purification treatment was performed, so that a dispersion (2) having a solid content of 10.0 percent by mass was obtained. The carbon black in the dispersion (2) was in the state in which pentaethylenehexamine was bonded to the surface of the carbon black. Next, 190 g of a styrene/acrylic acid copolymer having a weight average molecular weight of 8,000, an acid value of 140 mgKOH/g, and a molecular weight distribution Mw/Mn (weight average molecular weight Mw/number average molecular weight Mn) of 1.5 was weighed. Next, after 1,800 g of distilled water was added to the above copolymer, and potassium hydroxide necessary to neutralize the polymer was further added, stirring was performed to dissolve the polymer, so that a styrene/acrylic acid copolymer aqueous solution was prepared. Subsequently, 500 g of the dispersion (2) was dripped to the styrene/acrylic acid copolymer aqueous solution thus obtained under stirring conditions. The mixture of the dispersion (2) and the styrene/acrylic acid copolymer aqueous solution was placed on an evaporating dish and was then dried by heating for 15 hours at 150° C., and a dry substance thus obtained was then cooled to room temperature. Subsequently, after the dry substance was added to distilled water having a pH of 9.0 which was adjusted using potassium hydroxide and was then dispersed using a dispersion machine, a 1.0-N potassium hydroxide solution was further added under stirring conditions, so that the pH of the liquid was adjusted to 10 to 11. Then, a desalting treatment and a purification treatment were performed, so that impurities and large and coarse particles were removed. By the method described above, a pigment dispersion D in the state in which polymer-attach type carbon black was dispersed in water was obtained. In the pigment dispersion D, the content of the pigment (solid content) was 10.0 percent by mass, the pH was 10.1, and the average particle diameter of the pigment was 130 nm.

<Preparation of Ink>

Mixtures were prepared in combination of the pigment dispersions and the polyurethane polymer dispersions, which were obtained as described above, as shown in Table 3 and were further mixed with the following components. In this regard, the remainder, which was the amount of ion-exchanged water, refers to the amount determined in such a way that the total of all components constituting the ink became 100.0 percent by mass.

Pigment dispersion (content of pigment: 10.0 percent by mass): 30.0 percent by mass Polyurethane polymer dispersion (content of polymer: 20.0 percent by mass): see Table 3

Glycerin: 9.0 percent by mass

Diethylene glycol: 5.0 percent by mass

Triethylene glycol: 5.0 percent by mass

Acetylenol E100 (surfactant: manufactured by Kawaken Fine Chemicals Co., Ltd.): 0.1 percent by mass Ion exchange water: remainder After the mixture was dispersed by sufficient stirring, pressure filtration was performed using a microfilter (manufactured by Fujifilm Corp.) having a pore size of 3.0 µm, so that each ink was prepared.

<Evaluation>

The following evaluations were each performed using an ink jet recording apparatus PIXUS iP3100 (manufactured by CANON KABUSHIKI KAISHA). The contact angle of a face of a recording head of the ink jet recording apparatus PIXUS iP3100 with pure water was 90° or more. Recording conditions were set to a temperature of 23° C., a relative humidity of 55%, and an ejection amount per one droplet of 28 ng (within ±10%). In addition, in the above ink jet recording apparatus, an image recorded under conditions in which approximately 28 ng of one ink droplet was applied to a unit area of 1/600 inch×1/600 inch at a resolution of 600 dpi×600 dpi was defined as an image having a recording duty of 100%.

(1) Scratch Resistance of Image

An ink cartridge was filled with each ink obtained as described above and was then fitted to the ink jet recording apparatus. Next, a solid image (image having a recording duty of 100%) of 1.0 inch×0.5 inch was recorded on a PPC sheet GF-500 (manufactured by CANON KABUSHIKI KAISHA). Silbon paper and a weight having a contact pressure of 40 g/cm$^2$ were placed on the solid image 10 minutes or one day after the recording, and the solid image and the Silbon paper were rubbed together. Subsequently, after the Silbon paper and the weight were removed, contamination of the solid image and a transfer thereof to a white portion of the Silbon paper were visually inspected. The evaluation criteria for the scratch resistance of image are as follows. In the following evaluation criteria, AA and A were each regarded as a preferable level, and B, C, and Z were each regarded as a non-acceptable level. The evaluation results are shown in Table 3.

AA: Although contamination of the white ground portion was slightly observed in a test performed 10 minutes after the recording, the contamination level was not remarkable. In addition, in a test performed one day after the recording, contamination of the white ground portion was hardly observed.

A: Although contamination of the white ground portion was slightly observed in both the tests performed 10 minutes and one day after the recording, the contamination level was not remarkable.

B: The contamination of the white ground portion was observed in both the tests performed 10 minutes and one day after the recording.

C: The contamination of the white ground portion was remarkably observed in both the tests performed 10 minutes and one day after the recording.

Z: Ejection was unstable, and a normal image was not obtained.

(2) Highlighter Resistance of Image

An ink cartridge was filled with each ink obtained as described above and was then fitted to the ink jet recording apparatus. Subsequently, a vertical rule having a width of 1/10 inch was recorded on a PPC sheet GF-500 (manufactured by CANON KABUSHIKI KAISHA). Marking was performed on the vertical rule thus obtained using a yellow line marker OPTEX2 (manufactured by Zebra Co., Ltd.) 5 minutes or one day after the recording, and immediately after the marking, marking was performed on a white portion of the recording medium, and contamination of a marker nib and contamination of the marking on the white portion were checked. The evaluation criteria for the highlighter resistance of image are as follows. In the following evaluation criteria, AA and A were each regarded as a preferable level, and B, C, and Z were each regarded as a non-acceptable level. The evaluation results are shown in Table 3.

AA: Although color contamination was observed on the marker nib in a test performed 5 minutes after the recording, even by performing marking on the white portion, its contamination level was not remarkable. Color contamination was hardly observed on the marker nib in a test performed one day after the recording, and by performing making on the white portion, contamination was also hardly observed.

A: Although color contamination was observed on the marker nib in both the tests performed 5 minutes and one day after the recording, even by performing marking on the white portion, its contamination level was not remarkable.

B: Color contamination was observed on the marker nib in both the tests performed 5 minutes and one day after the recording, and the white portion was contaminated by marking.

C: Color contamination was apparently observed on the marker nib in both the tests performed 5 minutes and one day after the recording, and the white portion was contaminated by marking.

Z: Ejection was unstable, and a normal image was not obtained.

(3) Ink Ejection Stability

An ink cartridge was filled with each ink obtained as described above and was then fitted to the ink jet recording apparatus. Subsequently, a solid image (image having a recording duty of 100%) having a size of 19 cm×26 cm was recorded on 10 PPC sheets GF-500 (manufactured by CANON KABUSHIKI KAISHA). The ink ejection stability was evaluated by visually observing the solid images on the fifth and the tenth sheets. The evaluation criteria for the ink ejection stability are as follows. In the following evaluation criteria, A and B were each regarded as a preferable level, and C and Z were each regarded as a non-acceptable level. The evaluation results are shown in Table 3.

A: White streaks and faint streaking were not observed on the fifth and the tenth sheets.

B: Recording was normally performed on the fifth sheet, and although on the tenth sheet, white streaks and faint streaking were slightly observed, its level was not remarkable.

C: White streaks and faint streaking were observed on the fifth and the tenth sheets.

Z: Ejection was unstable, and a normal image was not obtained.

(4) Suppression of Image Deflection

An ink cartridge was filled with each ink obtained as described above and was then fitted to the ink jet recording apparatus. Subsequently, a solid image (image having a recording duty of 100%) having a size of 19 cm×26 cm was recorded on two PPC sheets GF-500 (manufactured by CANON KABUSHIKI KAISHA). Next, after the ink jet recording apparatus was held for 30 minutes, a step of recording an image similar to that described above on two sheets was performed. The step described above was regarded as one cycle and was repeatedly performed 10 cycles. Then, a nozzle check pattern of the above ink jet recording apparatus (PIXUS iP3100) was recorded on one sheet. The suppression of the image deflection was evaluated by visual inspection of the nozzle check pattern thus obtained. Furthermore, the recording head was removed, and the face was observed with a microscope to check whether the face wetting occurred or not. The evaluation criteria for the image deflection caused by the face wetting are as follows. In the following evaluation criteria, A and B were each regarded as a preferable level, and C and Z were each regarded as a non-acceptable level. The evaluation results are shown in Table 3.

A: The nozzle check pattern was not disordered, and the image deflection was suppressed. In addition, the face wetting was not generated.
B: Although the nozzle check pattern was disordered to a certain extent, its level was not remarkable, and the image deflection was suppressed. In addition, the face wetting was slightly generated.
C: The nozzle check pattern was remarkably disordered, a normal image was not obtained, and the image deflection was not suppressed. In addition, the face wetting was generated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-281061 filed Dec. 16, 2010, which is hereby incorporated by reference herein in its entirety.

What is claimed is:
1. An ink jet ink comprising:
a pigment; and
a polyurethane polymer having units derived from a polyisocyanate, a polyol, and a diol having an acid group,
wherein an acid value of the polyurethane polymer is 20 mgKOH/g or more and 100 mgKOH/g or less,

TABLE 3

| | COMBINATION OF PIGMENT DISPERSION AND PU POLYMER DISPERSION | | | | | MASS RATE OF CONTENT OF PU POLYMER | EVALUATION RESULTS | | | |
|---|---|---|---|---|---|---|---|---|---|---|
| | PIGMENT DISPERSION (CONTENT OF PIGMENT (SOLID COMPONENT): 10.0%) | | PU POLYMER DISPERSION (CONTENT OF POLYMER (SOLID COMPONENT): 20.0%) | | | | | | | |
| EXAMPLE NO. | TYPE | mass % | TYPE | mass % | | TO CONTENT OF PIGMENT (TIMES) | SCRATCH RESISTANCE OF IMAGE | HIGHLIGHTER RESISTANCE OF IMAGE | INK EJECTION STABILITY | SUPPRESSION OF IMAGE DEFLECTION |
| Example 1 | A | 30.0 | PU-1 | 4.5 | | 0.30 | AA | AA | A | A |
| Example 2 | A | 30.0 | PU-2 | 4.5 | | 0.30 | AA | AA | A | A |
| Example 3 | A | 30.0 | PU-3 | 4.5 | | 0.30 | AA | AA | A | A |
| Example 4 | A | 30.0 | PU-4 | 4.5 | | 0.30 | AA | AA | A | A |
| Example 5 | A | 30.0 | PU-5 | 4.5 | | 0.30 | AA | AA | A | A |
| Example 6 | A | 30.0 | PU-6 | 4.5 | | 0.30 | AA | AA | A | A |
| Example 7 | A | 30.0 | PU-7 | 4.5 | | 0.30 | AA | AA | A | A |
| Example 8 | A | 30.0 | PU-1 | 30.0 | | 2.00 | AA | AA | A | A |
| Example 9 | A | 30.0 | PU-1 | 30.2 | | 2.01 | AA | AA | B | A |
| Example 10 | A | 30.0 | PU-1 | 1.5 | | 0.10 | AA | AA | A | A |
| Example 11 | A | 30.0 | PU-1 | 1.4 | | 0.09 | A | A | A | A |
| Example 12 | A | 30.0 | PU-8 | 4.5 | | 0.30 | AA | AA | A | B |
| Example 13 | A | 30.0 | PU-9 | 4.5 | | 0.30 | AA | AA | A | A |
| Example 14 | A | 30.0 | PU-10 | 4.5 | | 0.30 | AA | AA | A | A |
| Example 15 | B | 30.0 | PU-1 | 4.5 | | 0.30 | AA | AA | A | A |
| Example 16 | C | 30.0 | PU-1 | 4.5 | | 0.30 | AA | AA | A | A |
| Example 17 | D | 30.0 | PU-1 | 4.5 | | 0.30 | AA | AA | A | A |
| Example 18 | A | 30.0 | PU-13 | 4.5 | | 0.30 | AA | AA | A | A |
| Example 19 | A | 30.0 | PU-14 | 4.5 | | 0.30 | AA | AA | A | A |
| Example 20 | A | 30.0 | PU-15 | 4.5 | | 0.30 | AA | AA | A | A |
| Comparative Example 1 | A | 30.0 | PU-16 | 4.5 | | 0.30 | Z | Z | C | C |
| Comparative Example 2 | A | 30.0 | PU-17 | 4.5 | | 0.30 | C | C | A | C |
| Comparative Example 3 | A | 30.0 | PU-18 | 4.5 | | 0.30 | Z | Z | C | C |
| Comparative Example 4 | A | 30.0 | PU-19 | 4.5 | | 0.30 | C | C | A | B |
| Comparative Example 5 | A | 30.0 | PU-20 | 4.5 | | 0.30 | C | C | A | C |
| Comparative Example 6 | A | 30.0 | PU-20 | 25.0 | | 1.67 | Z | Z | C | C |
| Comparative Example 7 | A | 30.0 | PU-21 | 4.5 | | 0.30 | Z | Z | Z | C |
| Comparative Example 8 | A | 30.0 | PU-11 | 4.5 | | 0.30 | B | B | A | A |
| Comparative Example 9 | A | 30.0 | PU-12 | 4.5 | | 0.30 | B | B | A | A |
| Comparative Example 10 | A | 30.0 | PU-22 | 4.5 | | 0.30 | B | B | A | A |
| Comparative Example 11 | A | 30.0 | PU-23 | 4.5 | | 0.30 | B | B | C | B | the unit derived from the polyisocyanate comprises a unit derived from a compound represented by the following general formula (I), and the proportion of the unit derived from the compound represented by the general formula (I) in the unit derived from the polyisocyanate is 90 percent by mole or less General formula (I)

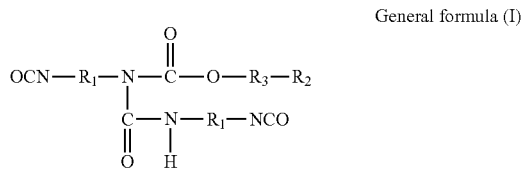

where in the general formula (I), $R_1$ indicates an alkylene group having 6 to 10 carbon atoms, a cycloalkylene group having 6 to 14 carbon atoms, or an arylene group having 6 to 16 carbon atoms, $R_2$ indicates an alkyl group having 1 to 5 carbon atoms, and $R_3$ at least has the structure represented by the following general formula (II)

General formula (II)

where in the general formula (II), n is 4 or more and 70 or less.

2. The ink jet ink according to claim 1, wherein the compound represented by the general formula (I) indicates a compound represented by the following general formula (IV)

General formula (IV)

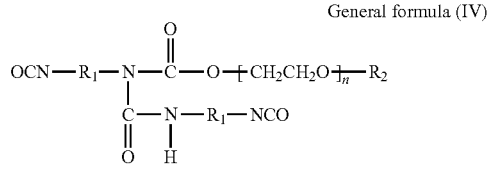

where in the general formula (IV), $R_1$ indicates an alkylene group having 6 to 10 carbon atoms, a cycloalkylene group having 6 to 14 carbon atoms, or an arylene group having 6 to 16 carbon atoms, $R_2$ indicates an alkyl group having 1 to 5 carbon atoms, and n is 4 or more and 70 or less.

3. The ink jet ink according to claim 1,
wherein a mass ratio of the content (percent by mass) of the polyurethane polymer to the content (percent by mass) of the pigment relative to the total mass of the ink is 0.10 times or more and 2.00 times or less.

4. An ink cartridge comprising:
an ink storage portion to store an ink,
wherein the ink stored in the ink storage portion is the ink jet ink according to claim 1.

5. An ink jet recording method comprising a step of ejecting an ink from an ink jet recording head to perform recording on a recording medium,
wherein the ink is the ink jet ink according to claim 1.

6. The ink jet ink according to claim 1, wherein the proportion of the unit derived from the compound represented by the general formula (I) in the unit derived from the polyisocyanate is 14 percent by mole or more.

7. The ink jet ink according to claim 1, wherein the compound represented by the general formula (I) is synthesized by using an allophanate forming catalyst.

8. The ink jet ink according to claim 1, wherein a content of the polyurethane polymer in the ink is less than 2.0 percent by mass based on the total mass of the ink.

9. The ink jet recording method according to claim 5, wherein a face of the ink jet recording head has a contact angle of 90° or more with pure water.

* * * * *